US011625258B2

(12) United States Patent
Wang (10) Patent No.: US 11,625,258 B2
(45) Date of Patent: Apr. 11, 2023

(54) METHOD, APPARATUS AND SYSTEM FOR REAL-TIME VIRTUAL NETWORK FUNCTION ORCHESTRATION

(71) Applicant: NOKIA SOLUTIONS AND NETWORKS OY, Espoo (FI)

(72) Inventor: Cheng Wang, Shanghai (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 146 days.

(21) Appl. No.: 16/760,117

(22) PCT Filed: Oct. 31, 2017

(86) PCT No.: PCT/CN2017/108653
§ 371 (c)(1),
(2) Date: Apr. 29, 2020

(87) PCT Pub. No.: WO2019/084793
PCT Pub. Date: May 9, 2019

(65) Prior Publication Data
US 2020/0334065 A1   Oct. 22, 2020

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4406* (2013.01); *G06F 9/5077* (2013.01);
(Continued)

(58) Field of Classification Search
CPC ................................. G06F 9/45558
(Continued)

(56) References Cited

U.S. PATENT DOCUMENTS

| 2005/0080965 A1* | 4/2005 | Bennett | G06F 9/45533 |
| | | | 710/200 |
| 2010/0138828 A1* | 6/2010 | Hanquez | G06F 9/45558 |
| | | | 718/1 |

(Continued)

FOREIGN PATENT DOCUMENTS

| CN | 104601492 A | 5/2015 |
| CN | 104615480 A | 5/2015 |

(Continued)

OTHER PUBLICATIONS

Enea Software AB, "Enea Linux Real-Time Guide", [Retrieved Jul. 14, 2021] Retrieved from the Internet: <URL: https://linux.enea.com/4.0/documentation/html/book-enea-linux-realtime-guide/>, (Jun. 17, 2014), 46 pages.

(Continued)

*Primary Examiner* — Mehran Kamran
(74) *Attorney, Agent, or Firm* — Alston & Bird LLP (57) ABSTRACT

Method, apparatus and system for real-time virtual network function orchestration in Real-time Cloud Infrastructure. The method comprises the step of updating and reporting CPU core RT performance; sending CPU and NUMA information; moving the IRQs from RT CPUset to Non-RT CPUset based on the CPU pool information response, and reporting the completion of IRQ clearance; moving the system tasks and OS background processes to Non-RT CPUset based on the CPU pool information response, and reporting the completion of system tasks clearance; clearing the known indeterminism sources based on the CPU pool information response, and reporting the completion of indeterminism sources clearance. The implementation of the method and apparatus improves that with support of NFV, edge cloud can speed new service deployment and achieve (Continued)

resource sharing among different services which allows operators to provision fewer resources.

7 Claims, 8 Drawing Sheets

(51) Int. Cl.
    *G06F 9/50*     (2006.01)
    *G06F 9/52*     (2006.01)
    *H04L 67/10*     (2022.01)

(52) U.S. Cl.
    CPC ...... *G06F 9/52* (2013.01); *G06F 2009/45595* (2013.01); *H04L 67/10* (2013.01)

(58) Field of Classification Search
    USPC .......................................................... 718/1
    See application file for complete search history.

(56) References Cited

U.S. PATENT DOCUMENTS

| | | | |
|---|---|---|---|
| 2011/0106995 A1* | 5/2011 | Gopalakrishnan | G06F 9/4812 710/269 |
| 2015/0169376 A1* | 6/2015 | Chang | G06F 9/5022 718/104 |
| 2016/0246652 A1 | 8/2016 | Herdrich et al. | |
| 2016/0306647 A1* | 10/2016 | Xia | G06F 9/4812 |
| 2017/0024231 A1* | 1/2017 | Riel | G06F 9/5077 |
| 2017/0203436 A1* | 7/2017 | Wei | B25J 9/161 |
| 2017/0244647 A1* | 8/2017 | Jin | G06F 9/45504 |
| 2017/0337074 A1* | 11/2017 | Tsirkin | G06F 9/45558 |
| 2019/0250836 A1* | 8/2019 | Pu | G06F 3/0665 |
| 2020/0127800 A1* | 4/2020 | Tang | H04W 72/042 |
| 2020/0264914 A1* | 8/2020 | Dasgupta | H04L 41/04 |
| 2020/0358666 A1* | 11/2020 | Dravid | H04L 41/0896 |
| 2021/0064429 A1* | 3/2021 | Stetter, Jr. | G06F 9/5027 |
| 2021/0152449 A1* | 5/2021 | Wang | H04L 43/08 |
| 2021/0359953 A1* | 11/2021 | Jin | H04L 67/10 |

FOREIGN PATENT DOCUMENTS

| | | |
|---|---|---|
| CN | 105429780 A | 3/2016 |
| CN | 105471649 A | 4/2016 |
| CN | 105634782 A | 6/2016 |
| CN | 105912396 A | 8/2016 |
| CN | 106533723 A | 3/2017 |
| WO | WO 2017 058274 A1 | 4/2017 |
| WO | WO 2018/162991 A1 | 9/2018 |
| WO | WO 2019/012333 A1 | 1/2019 |

OTHER PUBLICATIONS

Enea Software AB, "Enea Linux User's Guide", [Retrieved Jul. 15, 2021] Retrieved from the Internet: <URL: https://linux.enea.com/4.0/documentation/html/book-enea-linux-users-guide/index.html#enea-linux-networking>, (Jun. 17, 2014), 73 pages.
Extended European Search Report for European Application No. 17930793.9 dated Jul. 26, 2021, 12 pages.
Nakajima et al., "Building High-Performance NFV Solutions Using Containers", [Retrieved Aug. 17, 2015] Retrieved from the Internet: <URL: https://events.static.linuxfound.org/sites/events/files/slides/Jun_Nakajima_NFV_Container_final.pdf>, (Aug. 17, 2015), 30 pages.
ETSI, "Network Function Virtualisation (NFV); Management and Orchestration" ETSI GS NFV-MAN 001 v1.1.1, Dec. 31, 2014) 184 pages.
*Network Functions Virtualisation*, Introductory White Paper, Issue 1, SDN and OpenFlow World Congress (Oct. 2012) 16 pages.
*C-RAN The Road Towards Green RAN*, White Paper Version 2.5, China Mobile Research Institute (Oct. 2011) 48 pages.
Grinberg, M., *OpenStack Orchestration in Depth, Part I: Introduction to Heat*, [online] [retrieved May 28, 2020]. Retrieved via the Internet: https://web.archive.org/web/20160817110738/https://developer.rackspace.com/blog/openstack-orchestration-in-depth-part-1-introduction-to-heat/ (dated Aug. 17, 2016) 8 pages.
Tacker—OpenStack [online] [retrieved May 28, 2020]. Retrieved via the Internet: https://web.archive.org/web/20170701202503/https://wiki.openstack.org/wiki/Tacker (dated Jul. 1, 2017) 4 pages.
International Search Report and Written Opinion for Application No. PCT/CN2017/108653 dated Aug. 6, 2018, 6 pages.
Office Action for European Application No. 17930793.9 dated Aug. 2, 2022, 8 pages.
Office Action for Chinese Application No. 201780096470.4 dated Feb. 22, 2023, 18 pages.

\* cited by examiner

METHOD, APPARATUS AND SYSTEM FOR REAL-TIME VIRTUAL NETWORK FUNCTION ORCHESTRATION

CROSS-REFERENCE TO RELATED APPLICATIONS

This application is a national phase entry of International Application No. PCT/CN2017/108653, filed Oct. 31, 2017, the entire contents of which are incorporated herein by reference.

FIELD OF THE INVENTION

The present invention relates to a method, apparatus and system for real-time virtual network function orchestration in Real-time Cloud Infrastructure.

BACKGROUND OF THE INVENTION

In recent years, the mobile industry evolves toward IT-ization and cloudization. The underlying idea of Cloud RAN and Network Functions Virtualization (NFV) is to use General Purpose Processor (GPP) to do Radio Access Network (RAN) and CN processing as much as possible. This can exploit the economies of scale of the IT industry and leverage standard IT virtualization technology to consolidate many network equipment types onto industry standard servers (for example, x86 architecture), which could be located in datacenters. With the support of NFV, the mobile network functions are decoupled from hardware which speeds the new service deployment and achieves resource sharing among different services and exploit the advantages provided by cloud infrastructure.

Today's mobile RAN employs advanced technologies and algorithms to provide high network capacity which requires high processing capability to handle the PHY and MAC layers processing, it is possible to use hardware accelerator to offload some of the PHY compute-intensive functions like Turbo decoder. For example, the current real-time VNF usually contains the following problems:

1. Orchestration of real-time VNF are not covered in traditional Cloud Orchestrator.

One x86 CPU core can afford multiple virtual VNFs. In practical systems, the number of VNFs hosted by a machine can be far larger than the number of CPU cores on a machine. So VNFs have to share a CPU core. Furthermore, the number of VNFs hosted by a machine varies in time due to VNF lifecycle. When a VNF is instantiated, the orchestrator is recommended to determine on which machine the VNF will be placed. Some orchestrators have been developed to deploy cloud applications. Open Stack Heat is a kind of orchestrator which is used for deployment of IT applications like web servers, databases, etc. NFV Tacker is used to deploy VNFs like virtual CPE, CE and PE services. All the above VNFs are non-real-time services. That is, the traditional orchestrators and operating systems only focus on the allocation of computing resources to VNFs, including CPU time and memory. They don't care the real-time (RT) performance of the service very much.

2. Real-time performance of VNF can be impacted by many aspects

In the case where real-time services/VNFs are deployed in cloud environments, a new type of orchestrators that supports deployment of real-time VNFs (RT VNF) is required. Based on practical test, I/O operations can impact real-time performance greatly (The real-time performance of a system can be measured by the interval between the time when an event takes place and the time when the event is served). If the network adapter I/O interrupt thread shares the same CPU core with a real-time application, the real-time performance of the application can be degraded seriously. and the network throughput will also be reduced. The real-time performance for an application sharing CPU core with network adapter interrupt thread is given in Table-1. The results are obtained with network adapter sending packets at rate of 936 Mbps. From the Table-1 it is known that the real-time performance cannot meet L2 VNF requirement, as latency larger than 15 us is unacceptable.

TABLE 1

| Timer latency | percentage |
|---|---|
| >10 us | 12.83% |
| >15 us | 10.79% |
| >100 us | 4.28E−4 |
| Max (us) | 109.145 |

For an orchestrator which orchestrates RT VNFs, its orchestrating policy must be different from that for orchestration of traditional VNF which are non-RT applications. The use of CPU core must be carefully planned and the CPU cores for RT VNFs must be isolated from the cores that host I/O interrupt threads. That is, the placement of RT VNFs is recommended to be under the control of new orchestrator which can support RT VNF deployment. After the instantiation of a new RT VNF, the RT performance constraint of both the pre-existing RT VNFs and the newly deployed RT VNFs are recommended to be met.

3. Traditional embedded RT systems and RAN, RT performance monitoring mechanism is not necessary As these systems run on dedicated hardware appliances which don't involve new VNF instantiation, orchestration and resource sharing/consolidation, once the systems have been adjusted to work well, the RT constraints are always met and RT performance monitoring is unnecessary.

In cloud environment, the number of VNFs hosted by a server varies in time, the processing load of a VNF also varies in time, and the processing capability of CPU cores in the resource pool may be different, a RT performance monitoring mechanism is required.

SUMMARY OF THE INVENTION

In one embodiment, an aspect of this invention relates to a method, apparatus and system for real-time virtual network function orchestration with the method comprising the following steps:

reporting VNF RT performance updating and reporting CPU core RT performance based on the VNF RT performance;

sending CPU and NUMA information upon the completion of OS booting;

moving the IRQs from RT CPUset to Non-RT CPUset upon the completion of OS booting based on the CPU pool information response, and reporting the completion of IRQ clearance;

moving the system tasks and OS background processes to Non-RT CPUset upon the completion of OS booting based on the CPU pool information response, and reporting the completion of system tasks clearance;

clearing the known indeterminism sources upon the completion of OS booting based on the CPU pool information response, and reporting the completion of indeterminism sources clearance.

In another embodiment, an aspect of this invention relates to a method for real-time virtual network function orchestration, with the method comprising the following steps:
  a step of updating CPU pool based on the CPU and NUMA information, and synchronizing the CPU pool information;
  a step of modifying CPUset and sending CPU update command;
  a step of receiving RT VNF deployment request and selecting the target compute node and target CPU.

In another embodiment, an aspect of this invention relates to an apparatus of running on the compute node for real-time virtual network function orchestration, with the apparatus comprising the following modules:
  a module for reporting VNF RT performance;
  a module for updating and reporting CPU core RT performance based on the VNF RT performance;
  a module for sending CPU and NUMA information upon the completion of OS booting;
  a module for moving the IRQs from RT CPUset to Non-RT CPUset upon the completion of OS booting based on the CPU pool information response, and reporting the completion of IRQ clearance;
  a module for moving the system tasks and OS background processes to Non-RT CPUset upon the completion of OS booting based on the CPU pool information response, and reporting the completion of system tasks clearance;
  a module for clearing the known indeterminism sources upon the completion of OS booting based on the CPU pool information response, and reporting the completion of indeterminism sources clearance.

In another embodiment, an aspect of this invention relates to an apparatus of running on the RT cloud infrastructure for real-time virtual network function orchestration, with the apparatus comprising the following modules:
  a module for updating CPU pool based on the CPU and NUMA information, and synchronizing the CPU pool information;
  a module for modifying CPUset and sending CPU update command;
  a module for receiving RT VNF deployment request and selecting the target compute node and target CPU.

As such, the implementation of this invention improves that with support of NFV, edge cloud can speed new service deployment and achieve resource sharing among different services which allows operators to provision fewer resources. The expected RT cloud infrastructure is able to support RT VNFs deployment and meet the critical RT constraint for RAN processing.

DETAILED DESCRIPTION AND PREFERRED EMBODIMENT

The present invention will now be discussed in detail with regard to the attached drawing figures which are briefly described above. In the following description, numerous specific details are set forth illustrating the applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Figure 1:
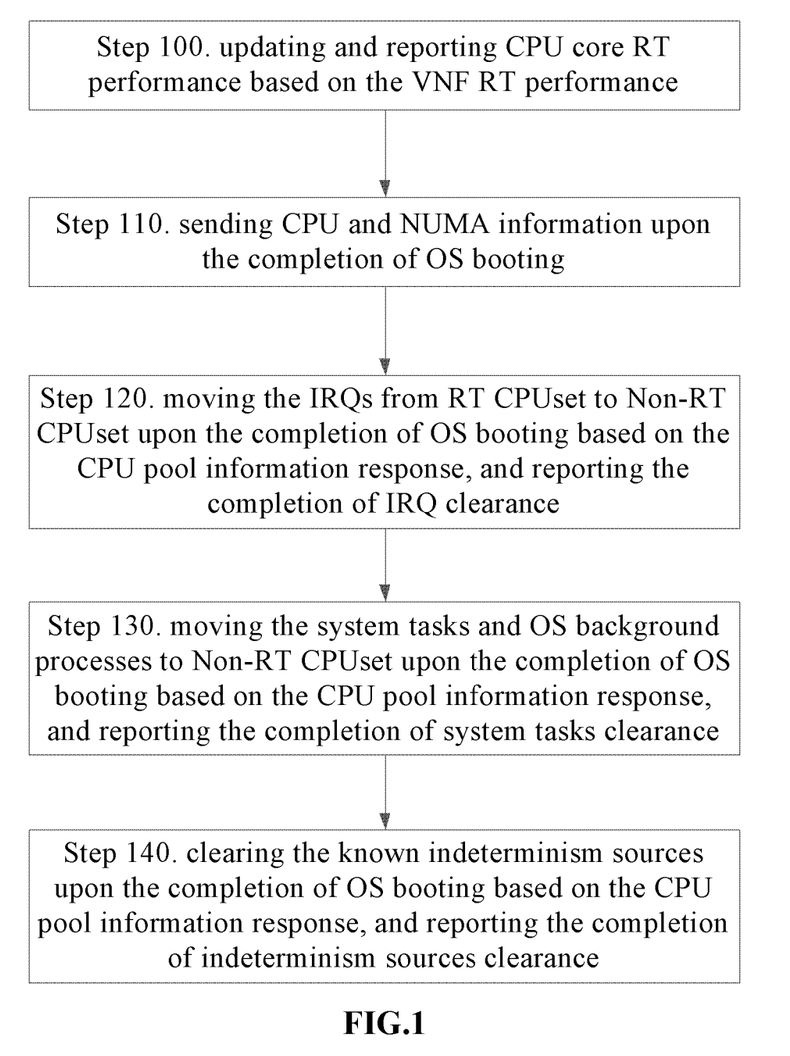
FIG. 1 is a flow chart illustrating a method of the present invention for real-time virtual network function orchestration.

Referring to FIG. 1, an embodiment of a method for real-time virtual network function orchestration comprises:
  at step 100, updating and reporting CPU core RT performance based on the VNF RT performance;
  at step 110, sending CPU and NUMA information upon the completion of OS booting;
  at step 120, moving the IRQs from RT CPUset to Non-RT CPUset upon the completion of OS booting based on the CPU pool information response, and reporting the completion of IRQ clearance;
  at step 130, moving the system tasks and OS background processes to Non-RT CPUset upon the completion of OS booting based on the CPU pool information response, and reporting the completion of system tasks clearance;
  at step 140, clearing the known indeterminism sources upon the completion of OS booting based on the CPU pool information response, and reporting the completion of indeterminism sources clearance.

Alternatively, the method for real-time virtual network function orchestration also comprises:
  a step of re-arranging IRQs, system tasks and indeterminism source based on the CPUset updating command.

Alternatively, the method for real-time virtual network function orchestration also comprises:
  a step of instantiating the VNF based on the VNF instantiation request.

Figure 2:
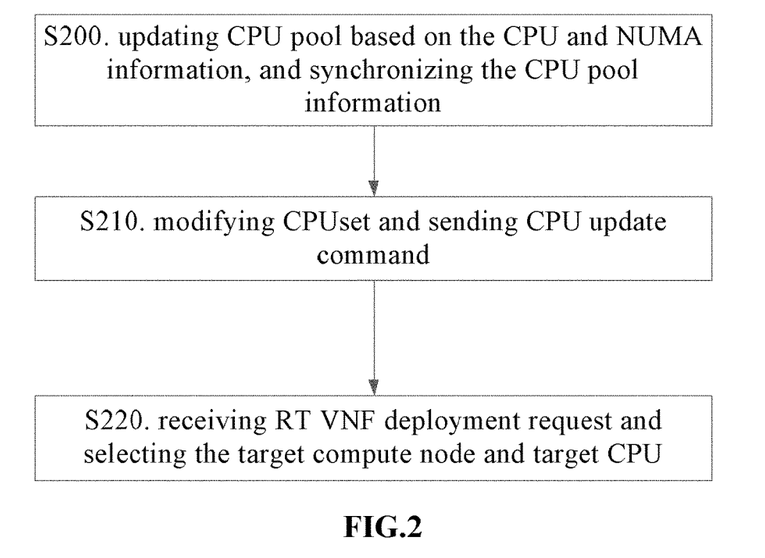
FIG. 2 is another flow chart illustrating a method of the present invention for real-time virtual network function orchestration.

Referring to FIG. 2, an embodiment of a method for real-time virtual network function orchestration comprises:
  at step 200, updating CPU pool based on the CPU and NUMA information, and synchronizing the CPU pool information;
  at step 210, modifying CPUset and sending CPU update command;
  at step 220, receiving RT VNF deployment request and selecting the target compute node and target CPU.

Base of the embodiment of a method for realizing dynamic point selection, this invention improves that with support of NFV, edge cloud can speed new service deployment and achieve resource sharing among different services which allows operators to provision fewer resources. The expected RT cloud infrastructure is able to support RT VNFs deployment and meet the critical RT constraint for RAN processing.

In another embodiment, a method of the embodiment for real-time virtual network function orchestration will be described in detail.

This embodiment focuses on two aspects:

1. The construction of real-time cloud infrastructure: This embodiment explicitly distinguishes real-time cloud infrastructure from traditional IT cloud infrastructure. The traditional cloud infrastructure is built for IT applications such as web server and database server, which has poor RT performance. In order to guarantee the RT performance of RT VNFs, the underlying infrastructure is recommended to be able to support RT tasks natively. This requires the compute node in the cloud to be installed with real-time operating system (RTOS) and the cloud resource is recommended to be managed by virtualization platform with good RT performance.

2. With RTOS and RT hypervisor, it is still not enough to support RT VNFs, as too many aspects can impact Linux RT performance. This embodiment proposes a new type of orchestrator for deployment of RT VNFs which is quite different from traditional orchestrator. The proposed orchestrator includes several functions: CPU use planning and CPU isolation, management of source of indeterminism in RT performance, management of system tasks and IRQs, etc. RT VNF orchestration mechanism is also presented which is based on VNF RT performance measurement.

From the preceding discussion, it is known that there is no available orchestrator for real-time VNF orchestration. In order to achieve RAN processing in cloud infrastructure and meet the real-time constraints, real-time cloud infrastructure needs to be constructed and a new type of orchestrator is needed for deployment of RT VNFs in the RT cloud.

With support of NFV, edge cloud can speed new service deployment and achieve resource sharing among different services which allows operators to provision fewer resources. However, implementation of RAN functions in IT server based edge cloud is still very challenging. Although in cloud environment resource sharing between VNFs can improve resource utilization, it can degrade real-time performance as a sequence. How to guarantee RAN function RT performance and let operators take advantages of cloud computing is a tradeoff.

For traditional RAN, the system running on dedicated hardware appliances is a relatively static system with fixed number of RT processes/threads and the maximum processing load is predictable. This system doesn't involve dynamic VNF instantiation, orchestration and resource sharing/consolidation. Once the system has been adjusted to work well, the RT constraints are always met and RT performance monitoring is unnecessary. For Cloud RAN, the VNF may be deployed or destroyed dynamically, as there is limited number of CPU cores in a machine which is far less than the number of VNFs hosted by a machine. Thus, these VNFs have to share CPU core with each other. In this case, it is more challenging to guarantee all the VNFs to meet their RT performances.

As discussed in the Background of The Invention, the mobile industry evolves toward IT-ization and cloudization to use GPP, for example, x86 architecture, to do RAN and CN processing as much as possible. This can exploit the economies of scale of the IT industry and take advantages brought by cloud infrastructure. The general purpose of operating systems and virtualization platform used by traditional IT cloud cannot support RAN processing due to the poor RT performance.

An RT cloud infrastructure is recommended to be built with a systematic view. the proposed GPP based RT cloud infrastructure includes the following key technologies:

1. Real-time Operating System (RTOS) for compute node in the cloud: we use Linux with PREEMPT_RT patch installed as the RTOS for cloud compute node. PREEMPT_RT is the official patch for Linux kernel which makes Linux gain real-time capabilities. Two methods are available for PREEMPT_RT patch installation, including kernel re-compiling or direct installation of pre-built rpm/deb packages for RT kernel.

2. Real-time virtualization technology/hypervisor: Linux Container-type virtualization technology is adopted in our solution which is a kind of lightweight hypervisor. Linux Container achieves near-native RT performance. In practical system, Docker Container can be used as the virtualization platform as it is more mature than Libvirt Container and OpenVZ.

3. A new type of Orchestrator for RT VNFs orchestration: This new orchestrator includes several functions such as CPU isolation, system tasks management, IRQs management, RT VNF orchestration, etc. CPU isolation technology is very important for RT performance improvement. The CPUs in the cloud is divided into three pools to avoid non-real-time (non-RT) VNFs to compete resources with RT VNFs. One significant difference between the proposed orchestrator and the traditional orchestrator is that the proposed orchestrator monitors the resource usage and VNF performance and deploys VNFs on per-CPU basis, and decides onto which CPU core of which machine the new VNF is recommended to be placed. Traditional orchestrators monitor the resource usage and system performance on per-host basis, it only selects a target machine, but not a target CPU, and it is the local operating system that plays the main role for task scheduling. It is obvious that the proposed orchestrator schedules the resources and tasks with a finer granularity. This is because careful planning CPU use combing with system tasks and IRQ management can significantly improve VNFs' RT performance. Another important different between the proposed orchestrator and the traditional orchestrator is that the proposed orchestrator's orchestration policy is based on both VNFs' RT performance measurement and CPU utilization, the proposed orchestrator's main task is to guarantee both the newly deployed RT VNF and each of the existing VNFs' RT constraints to be met when these VNFs share a CPU core. It is the proposed orchestrator but not the local OS that determines on which CPU core the VNF will be placed. In the context of traditional orchestrator, there is no RT performance concept, the traditional orchestration policy mainly considers CPU and memory usage which cannot be applied to RT VNF orchestration.

From the hardware point of view, the proposed RT cloud infrastructure uses the same general purpose of hardware platform as the traditional IT cloud, except that some hardware configurations may be different.

Figure 3:
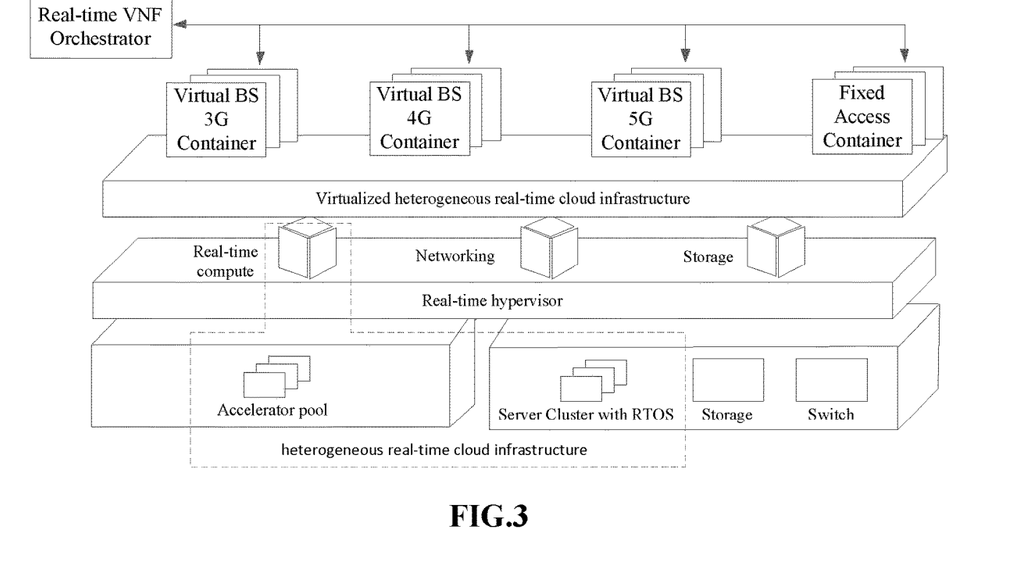
FIG. 3 is a block diagram illustrating Real-time Edge Cloud infrastructure architecture.
Figure 4:
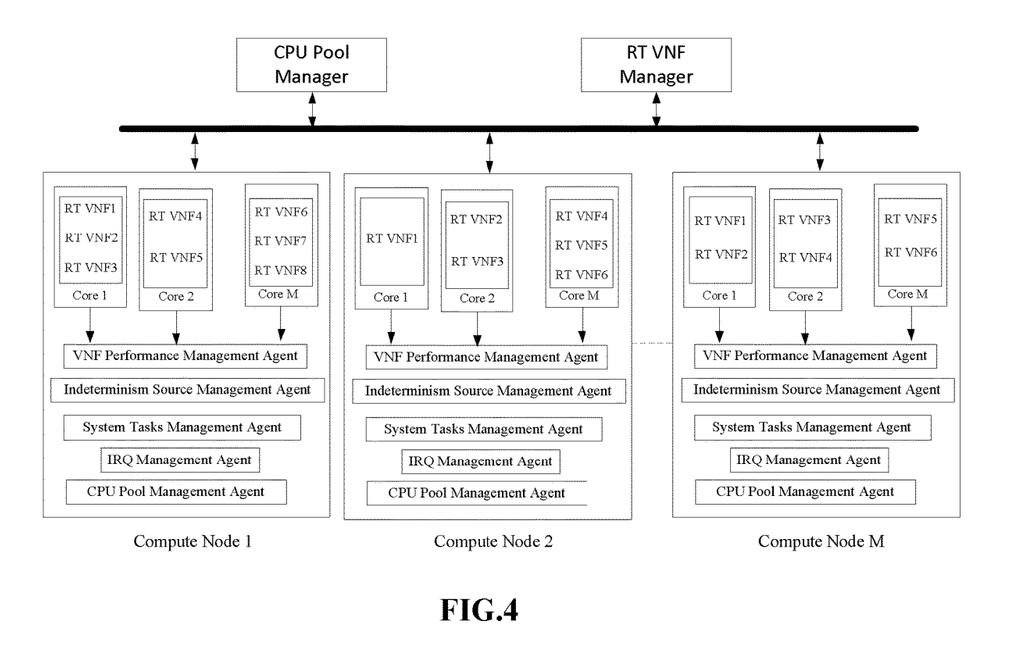
FIG. 4 is a block diagram illustrating Real-time VNF orchestrator software architecture.

All the three key technologies discussed above are indispensable to RT cloud infrastructure which are not required by traditional IT cloud. FIG. 3 depicts the proposed RT cloud infrastructure architecture. FIG. 4 gives the software architecture for the proposed RT VNF orchestrator which is an important part of the RT cloud infrastructure.

Although the RTOS and Linux Container is introduced as the operating system and virtualization platform, it is still not enough for the compute node to achieve good RT performance. For GPP servers, even the application load is very low, there always exists a large number of daemon processes and system tasks keeping running on the machine and many of them are critical tasks which can degrade system RT performance. Furthermore, management of a large number of peripheral devices also degrades system RT performance. This is why RT performance of an IT server is more challenging than an embedded system. When constructing GPP based RT cloud infrastructure, it is not simply to stack these technologies together. All aspects that impact VNF RT performance are recommended to be considered by the orchestrator and some policies on how to use cloud infrastructure must be obeyed.

The RT performance of Linux is a very complicated topic, the consequence is that the aspects which impact Linux RT performance are summarized as follows.

Lower load helps improve RT performance, overloaded can be avoid. According to our observation, if a VNF shares the CPU core with I/O interrupt thread, the RT performance of VNF is bad even though the CPU core has low load. It is the I/O interrupts that introduce unpredictable latency.

The processor's capability can also impact RT performance, a powerful processor helps improve RT performance, but the RT performance of a system doesn't necessarily to be met even though it has powerful processor. This is why RTOS is needed.

Task scheduling policy and task priority: Linux provides some scheduling policy for RT applications, such as SCHED_FIFO, SCHED_RR and SCHED_DEADLINE. The RT application can also be set with higher priority than non-RT applications.

Kernel Preemptibility: With the installation of PREMPT_RT patch, the Linux kernel provides several RT modes, such as Preemptable Kernel (Low-Latency Desktop), Preemptable Kernel (Basic RT), Fully Preemptive Kernel (RT). Fully Preemptable Kernel is preferred for RT VNFs orchestration.

Task switch overhead: Frequent task switches can introduce overhead and reduce RT performance.

OS background processes and system tasks: There are a large number of OS background processes and system tasks running on Linux systems. To avoid resource competition with RT VNFs, these background processes and system tasks can be isolated from the RT VNFs.

The hardware interrupt request (IRQ), software IRQ and system timers are sources of indeterminism which introduce unpredictable latency. These sources can be managed by the orchestrator.

CPU load balancer introduced by Linux kernel always tries to evenly distribute tasks over all the available CPUs. This is problematic for RT VNF orchestration, as non-RT tasks could be moved to the CPU cores for RT VNFs, and RT tasks could be moved to CPU core for non-RT tasks. This increases indeterminism in RT performance.

Figure 5:
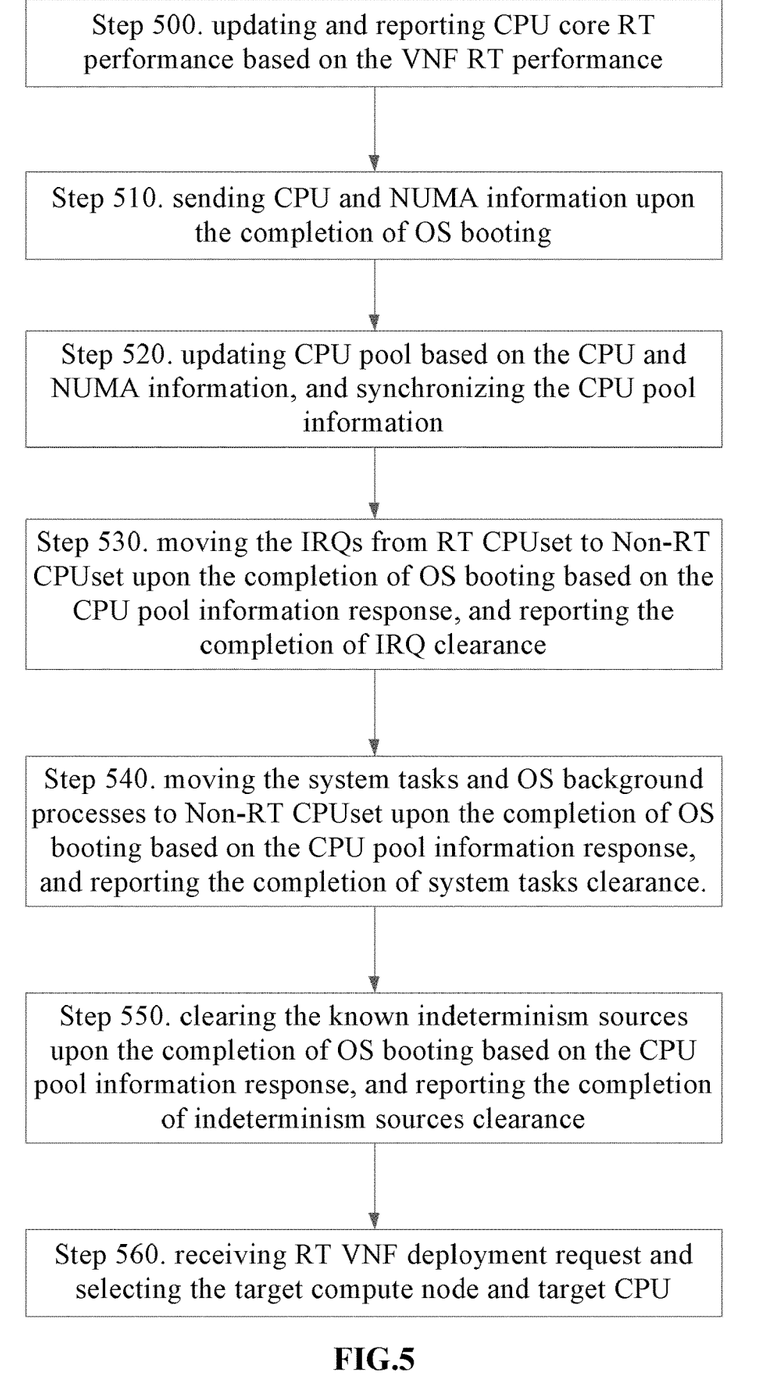
FIG. 5 is a flow chart illustrating a method of the embodiment for real-time virtual network function orchestration.

Aiming at the above problems, this invention provides the functions included in the proposed orchestrator which are for tuning the RT performance of the compute nodes and VNF orchestration FIG. 5 illustrates a method for real-time virtual network function orchestration, including the following steps:

At step 500, updating and reporting CPU core RT performance based on the VNF RT performance.

VNF Performance Management Agent collects the local resource usage of each compute node, especially focuses on the RT performance reports sent by VNFs. The updated RT performance and CPU utilization are then forwarded to VNF Manager.

At step 510, sending CPU and NUMA information upon the completion of OS booting.

When adding a new compute node in the cloud, the local CPU Pool Management Agent reports the CPU core number and NUMA node number to the CPU Pool Manager.

At step 520, updating CPU pool based on the CPU and NUMA information, and synchronizing the CPU pool information.

As the OS background processes, system tasks and non-RT VNFs can compete CPU time with the RT VNFs and introduce uncertain impact on RT performance, these processes can be isolated from each other. In this embodiment, it is categorized into three kinds of processes for RAN processing: RT processes, non-RT processes and DPDK processes. The GPP computing resources are also divided into three kinds of groups/pools corresponding to the three kinds of processes.

CPU pool for RT VNFs: MAC scheduler is such an RT VNF which includes downlink and uplink scheduler entities. The RT performances of RT VNFs running in this kind of CPU Pool are monitored with the certain mechanism.

CPU pool for Non-RT VNFs: Not all RAN VNFs require high RT performance. For example, timer events of RRC are usually on the order of tens of milliseconds. Compared to PHY and MAC processing, this kind of processes can be considered as non-RT VNFs. In practical system, the background processes and system tasks also can be placed in this pool. The reason why there has a dedicated CPU pool for non-RT processes is that RT processes usually have higher priority than non-RT processes. In the case where RT VNFs share a CPU with non-RT VNFs, the non-RT VNFs may be throttled if the load of RT VNFs is high.

CPU pool for DPDK processes: DPDK is widely used in products which is a set of drivers and libraries for fast packet processing. DPDK requires dedicated CPU cores for packet receiving and processing in order to achieve high throughput. So, there has a dedicated CPU pool for DPDK processes/threads.

Figure 6:
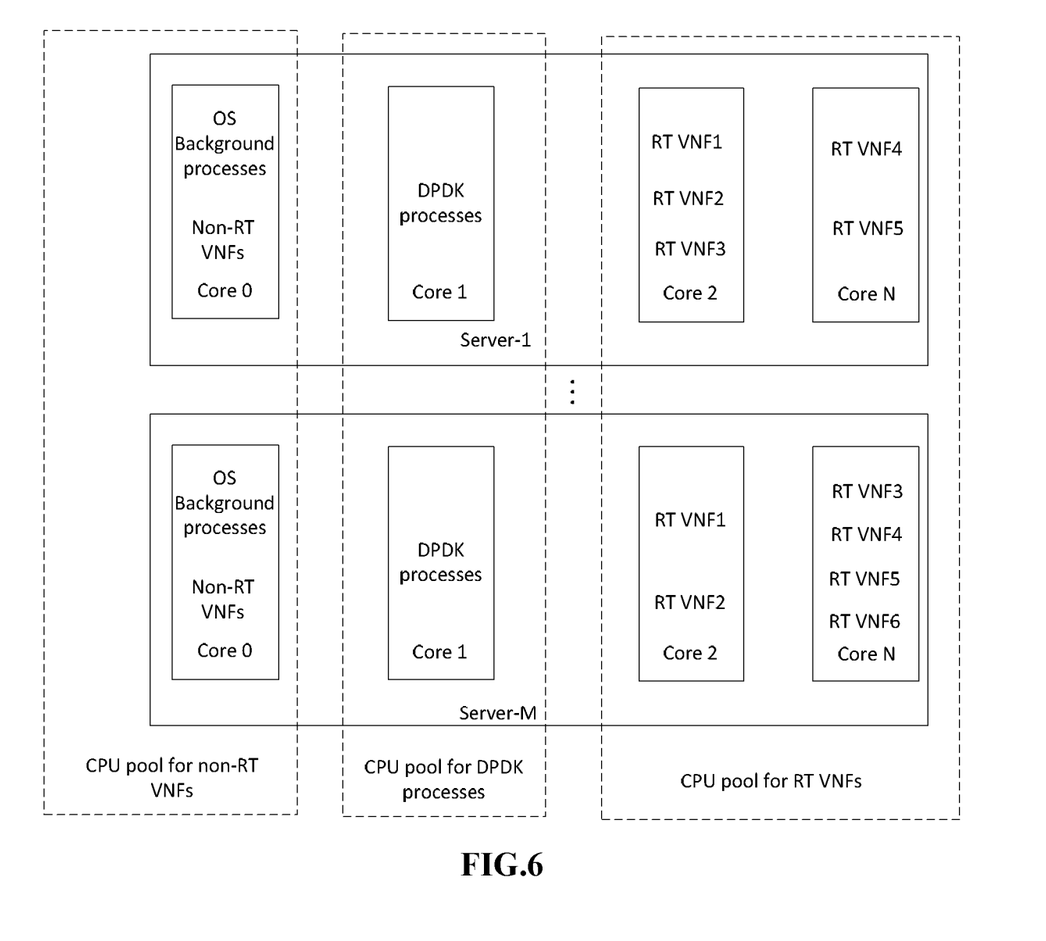
FIG. 6 is a block diagram illustrating computing resource pool and CPU use planning.

The CPU Pool Manager is responsible for the maintenance of all the CPU pools, increase or decrease CPU cores in a pool as the machine may be powered on/off on demand and the available CPU cores varies in time. The CPU Pool Manager has global view of the use of CPU core. Each kind of pools spans across multiple compute nodes as shown in FIG. 6. There is an entry for each CPU core of a machine in the pool. When the VNF manager needs to deploy a VNF, it asks the CPU Pool Manager for the available machine list for RT VNFs or non-RT VNFs, according the type of VNF to be deployed.

When receiving the CPU core number and NUMA node number, CPU Pool Manager divides CPU cores of the new compute node into different pools. CPU Pool Manager provides core information for other network elements to facilitate RT performance tuning on a compute node.

At step 530, moving the IRQs from RT CPUset to Non-RT CPUset upon the completion of OS booting based on the CPU pool information response, and reporting the completion of IRQ clearance.

Although IRQ load balancing is disabled by Indeterminism Source Management Agent, this cannot prevent some IRQs from being initially placed on the CPUs in RT CPUset during system booting, which have serious negative impact on RT performance. These IRQs can be handled by the CPUset for non-RT or background processes. IRQ Management Agent is responsible for moving these IRQs from RT CPUset to non-RT CPUset. The affinity of these IRQs can be controlled using the /proc file system. Assuming CPU0 and CPU1 are for non-RT tasks, the default affinity is first set to CPU0 or CPU1 to make sure that new interrupts won't be handled by the RT CPUs. The set {CPU1, CPU0} is represented as a bitmask set to 3, (0000,0011B)

echo 3>/proc/irq/default_smp_affinity
Then move IRQs to the non-RT CPUset
echo 3>/proc/irq/<irq>/smp_affinity All active IRQs can be found in file/proc/interrupts. When moving the IRQs, the IRQ Management Agent is recommended first to query the CPU Pool Manager to obtain the CPU index for non-RT tasks on this compute node.

At step 540, moving the system tasks and OS background processes to Non-RT CPUset upon the completion of OS booting based on the CPU pool information response, and reporting the completion of system tasks clearance.

For a compute node to host RT tasks, even though with the management of indeterminism source, sometimes system tasks still can be observed on the CPUs in the RT CPUset after system is booted. System Tasks Management Agent is responsible for moving system tasks from the CPUs in the RT CPUset to the CPUs in non-RT CPUset or to the CPUs in the background processes CPUset if it exists. Run the following command to move system tasks.

echo pid_of_task>/sys/fs/cgroup/cpuset/nonrt/tasks

The process IDs of these system tasks can be found in pseudo-file
/sys/fs/cgroup/cpuset/rt/tasks.

At step 550, clearing the known indeterminism sources upon the completion of OS booting based on the CPU pool information response, and reporting the completion of indeterminism sources clearance.

For a Linux system, there are many sources which introduce indeterminism in RT performance. Indeterminism Source Management Agent is responsible for configuring or modifying Linux system parameters so that its RT properties become more deterministic. The main management work of Indeterminism Source Management Agent is briefly described below:

Disable CPU load balancer and define CPUset: In the default setting, Linux's task scheduler is free to migrate tasks to evenly distribute the processing load among the available CPUs. That might be good for throughput, but it could damage RT performance. To turn off automatic load balancing and statically assign tasks to CPUs can increase determinism. At least three kinds of method can be used to assign a task to a specific CPU, including sched_setaffinity( ) system call, taskset command and CPUset mechanism. For example, when the VNF Manager has selected a proper CPU core on a compute node to place the RT VNF, the ID of the target CPU core is transferred to the VNF as an argument, then the VNF can use sched_setaffinity( ) to pin the RT threads to the given CPU core. The Linux kernel CPUset mechanism can also be used to control the processor placement and memory placement of processes. In practice, at least 3 CPUsets can be defined. One is for RT VNFs, one is for DPDK processes, the other is for non-RT VNFs. By default, load balancing is done across all CPUs, except those marked isolated using the kernel boot time "isolcpus" option. The CPU cores can be isolated for RT VNFs and DPDK from the CPU cores for non-RT VNFs, background processes and system tasks by setting the "isolcpus" option in file grub.cfg. The use of CPUs in CPU pools for RT VNFs and DPDK is better to be under the control of the proposed RT VNF Manager, but not the OS scheduler. This can be achieved by setting the pseudo-file cpuset.sched_load_balance to 0 which disables the automatic load balancing over the allowed CPUs in the defined CPUsets (the load balancing in root CPUset also can be disabled). Furthermore, to avoid non-RT tasks to use RT CPUset, it is needed to make the CPUs in the RT CPUset exclusive by setting RT cpuset's pseudo-file cpuset.cpu_exclusive set to 1. The local CPU core lists marked by "isolcpus" option is recommended to be synchronized with the CPU Pool Manager so that the CPU Pool Manager has the global view of CPU cores use.

Management of NUMA memory node: In NUMA system, the CPU accesses to its own memory node is faster than other memory node. The RT CPUset and non-RT CPUset need to be associated with their own memory nodes. In the case where there are more than two NUMA memory nodes, if the CPU cores assigned to RT VNFs belong to different NUMA node, it is better to create multiple CPUsets for the RT tasks and each RT CPUset is associated to its own memory node. This helps improve RT performance of RT VNFs. The locally defined CPUset information is recommended to be synchronized with the CPU Pool Manager. The following command associates NUMA node 2 with RT CPUset and make NUMA node two exclusive to the RT CPUset.

echo 2>/sys/fs/cgroup/cpuset/rt/cpuset.mems
echo 1>/sys/fs/cgroup/cpuset/rt/cpuset.mem_exclusive Management of IRQ affinity: By default, Linux enables the interrupt request (IRQ) load balancing service which evenly distributes IRQs across all the CPUs in the system. If an IRQ is serviced on the CPU which is currently executing real-time VNFs, the CPU has to switch contexts which when combined with cache misses can cause tens of microseconds of latency. By stopping this service (IRQ balance) it allows us to control on which CPU interrupts will run. In practical system, we can configure the mask in the smp_affinity file and assign certain IRQs, for example, interrupts from SCSI controller or Ethernet card, to be handled by specific CPUs. The CPUs can be selected from the non-RT CPU pool.

Disable CPU frequency scaling: By default, Linux enable dynamic CPU frequency scaling in order to reduce power consumption. But this technique can affect the system's RT properties. For CentOS, two methods can be used to disable CPU frequency scaling. 1. edit/etc/default/grub to include the line GRUB_CMDLINE_LINUX_DEFAULT="intel_pstate=
disable" and run grub2-mkconfig -o /boot/grub/grub.cfg. 2. recompile Linux kernel without CPU frequency scaling option.

Management of RT throttling mechanism: To prevent the RT applications scheduled as SCHED_FIFO or SCHED_RR from consuming all CPU power, an RT throttling mechanism is used by Linux kernel to limit the amount of CPU power that the RT tasks can consume. The default setting for this mechanism is that RT tasks can consume up to 95% of CPU power of a machine. This can be changed by writing the new number to files:
/proc/sys/kernel/sched_rt_runtime_us
and
/proc/sys/kernel/sched_rt_period_us Disable memory overcommit: By default, the Linux kernel allows applications to allocate more memory than is actually available in the system. The idea of memory overcommit is to provide a more efficient memory usage, under the assumption that processes typically ask for more memory than they will actually need. Overcommitting means there is a risk if processes try to utilize more memory than is available. If this happens, the kernel invokes the Out-Of-Memory Killer to scan through the task list and selects a task to kill to reclaim memory. In this case, the whole system may become unresponsive for a significant amount of time which is unacceptable for RT VNFs. Memory overcommit can be disabled by the following command:
echo 2>/proc/sys/vm/overcommit_memory Offload RCU callbacks: The Read-Copy-Update (RCU) system is a lockless mechanism for mutual exclusion inside the kernel which improves data sharing among threads. As a consequence of performing RCU operations, callbacks, done as a soft IRQ by default, are queued on CPUs to be performed at a future moment when removing memory is safe. This adds unpredictable latencies to application. RCU callbacks can be offloaded using the "rcu_nocbs" and "rcu_nocb_poll" kernel boot parameters. To remove one or more CPUs from the candidates for running RCU callbacks, specify the list of CPUs in the "rcu_nocbs" kernel parameter, for example: "rcu_nocbs=4-6" means that RCU callbacks will not be done on CPU4, CPU5 and CPU6.

Set TSC boot parameter: The time stamp counter is a per-CPU counter for producing time stamps. Since the counters might drift a bit, Linux will periodically check that they are synchronized. By telling Linux with boot parameter "TSC=reliable" that the counters are reliable, Linux will no longer perform the periodic synchronization. This improves Linux RT performance.

Remove vmstat timer: vmstat timer is used for collecting virtual memory statistics. The statistics are updated at an interval specified as seconds in file/proc/sys/vm/stat_interval. The amount of jitter can be reduced by writing a large value to this file. However, that will not solve the issue with worst-case latency. Linux kernel version 3.12 or newer removes the periodic statistics collection and replaces it with a solution that only triggers if there is actual activity that needs to be monitored.

BDI writeback affinity: Since block I/O can have a serious negative impact on RT performance, it is recommended to be moved to the non-RT CPUset. Two steps are needed:
Disable NUMA affinity for the writeback threads
echo 0>/sys/bus/workqueue/devices/writeback/numa
Assuming CPU0 and CPU1 are in the non-RT CPUset, set the affinity to the CPUset
echo 3>/sys/bus/workqueue/devices/writeback/cpumask Disable machine check: The x86 architecture has a periodic check for corrected machine check errors. The periodic machine check requires a timer that causes jitter. The periodic check can be disabled on the RT CPUs. For each CPU in the RT CPUset, do the following:
echo 0>/sys/devices/system/machinecheck/machinecheck<cpu>/check_interval
echo 0>/sys/devices/system/machinecheck/machinecheck2/check_interval
echo 0>/sys/devices/system/machinecheck/machinecheck3/check_interval Disable the watchdog: The watchdog timer is used to detect and recover from software faults. It requires a regular timer interrupt which is a jitter source. This interrupt can be removed at the cost of less error detection. The watchdog can be disabled at compile time or in runtime as follows:
echo 0>/proc/sys/kernel/watchdog Increase flush time to disk: To make writebacks of dirty memory pages occur less often than the default, we can do the following:
echo 1500>/proc/sys/vm/dirty_writeback_centisecs Network queues affinity: If applications need to send or receive network traffic, some timers are created for network protocols on the specific CPUs. If there is a need of network traffic only on the non-RT applications, network queues affinity can be set as follows to improve RT properties:
echo <NRT cpus mask>>/sys/class/net/<ethernet interface>/queues/<queue>/<x/r>ps_cpus All the above management and configuration modifications can be done by Indeterminism Source Management Agent in an automatic way. To ensure the kernel boot parameter modifications take effects, the compute node needs to reboot.

At step 560, receiving RT VNF deployment request and selecting the target compute node and target CPU.

In a practical system, for a given type of VNF, the maximum processing load is usually known which can be used to estimate if the new VNF can be accommodated on a CPU core. The following steps can be used by VNF Manager to select the target CPU core.
Select a set of CPU cores with better RT performance from the CPU pool for RT VNFs;
Obtain the types and the numbers of VNFs hosted by each CPU core in the set;
Calculate the potential maximum processing load on each CPU core in the set according the types and the numbers of VNFs;
Recalculate the potential maximum processing load on each CPU core in the set assuming the new VNF is deployed on it;
Select a subset of CPU cores from the set which can accommodate the new VNF's maximum processing load and has higher margin;
Select the CPU core with the best RT performance from the subset as the target CPU.

Once the target CPU core is selected, the ID of the target CPU core will be transferred to the target compute node. the new VNF will be instantiated on the target CPU core under the control of local VNF Performance Management Agent.

The difference between two timestamp counters $T_{rep}$ and $T_{exp}$ is used to measure the RT performance. For the VNF with multiple threads, only one thread needs to measure the interrupt latency. The timestamp $T_{local}$ is different from $T_{rep}$ and $T_{exp}$, it is gotten from the local compute node's system clock, not from the PCIe device. For a VNF with multiple threads, $T_{local}$ is recommended be gotten by the thread which is responsible for getting $T_{rep}$. The difference between two contiguous $T_{local}$ ($T_{local2}-T_{local1}$) can also be used to monitor the RT performance. If the difference approaches one millisecond, it means the processing load on this CPU core is very high which is recommended not to accept new VNF anymore.

Figure 7:
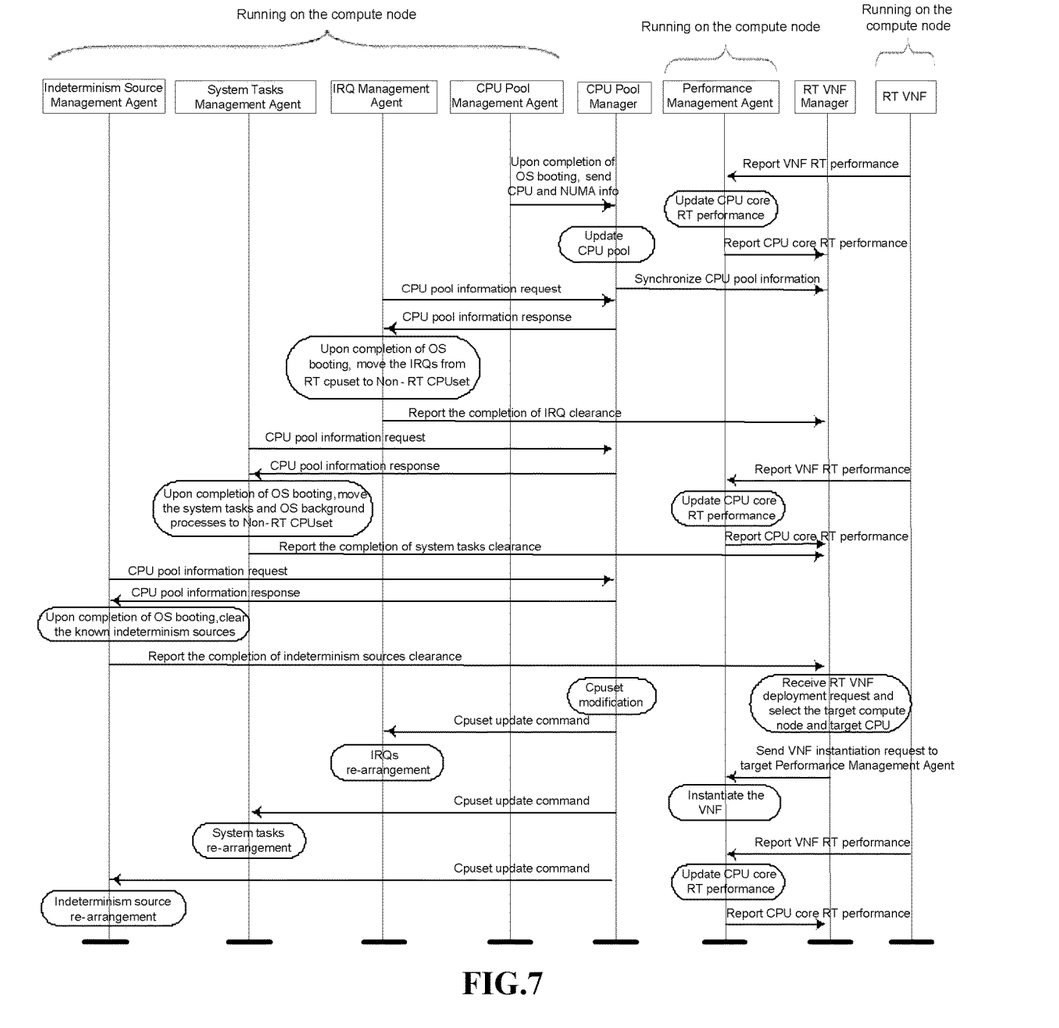
FIG. 7 is a flow chart illustrating interactions between VNF orchestrator functions.

FIG. 7 illustrates the interactions between these functions of the proposed orchestrator. RT VNFs periodically report their RT performances to local VNF Performance Management Agent. Performance Management Agent summaries these reports and extracts the RT performances (for example, the worst RT performance of a VNF hosted by a CPU core) for each CPU core and reports to RT VNF Manager. After completion of compute node booting, the local CPU Pool Management Agent reports the local CPU and NUMA information to CPU Pool Manager, CPU Pool Manager makes decision on which CPUs to be added to RT CPUset, non-RT CPUset and DPDK CPUset respectively, then the IRQ Management Agent sends request to CPU Pool Manager to obtain the local CPUset information and then moves the IRQs from the RT CPUset to non-RT CPUset. System tasks Management Agent sends requests to CPU Pool Manager and moves system tasks and background processes to the non-RT CPUset according to the received CPUset information. Based on the CPUset information, Indeterminism Source Management Agent changes the IRQ affinity, RCU callback affinity, BDI writeback affinity, etc. Once the local CPUset is changed by CPU Pool Manager under certain condition, all these agents need to re-arrange the affinities according to the new CPUset. When a new RT VNF needs to be deployed, RT VNF Manager selects the target compute node and the target CPU and sends the orchestration parameters to the local Performance Management Agent. Under the control of Performance Management Agent, the VNF is instantiated on the target CPU core.

This embodiment describes how to select target machine and target CPU. This is just an example for orchestration policy. It is proposed that the orchestrators monitor VNF RT performance, and the orchestration policy may be different depending on how to use the measured RT performance.

Figure 8:
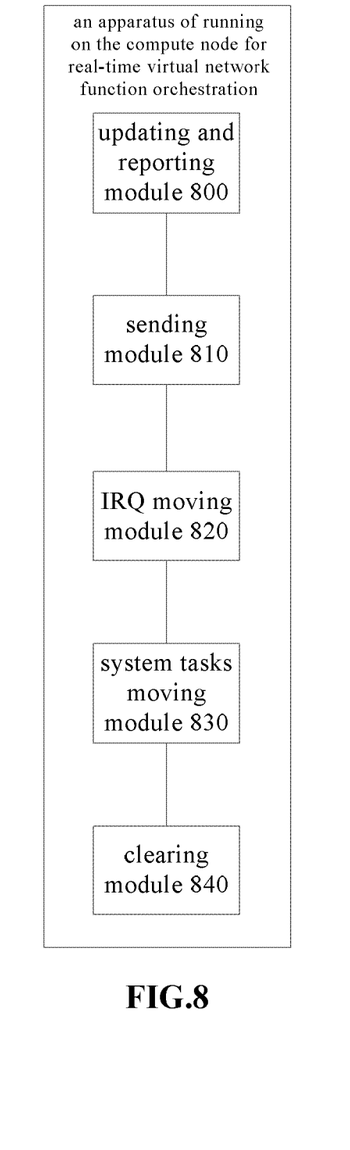
FIG. 8 is a block diagram illustrating an apparatus of the present invention of running on the compute node for real-time virtual network function orchestration.

FIG. 8 illustrates an embodiment of an apparatus of running on the compute node for real-time virtual network function orchestration, including the following modules:

a module for updating and reporting CPU core RT performance based on the VNF RT performance (updating and reporting module 800);

a module for sending CPU and NUMA information upon the completion of OS booting (sending module 810);

a module for moving the IRQs from RT CPUset to Non-RT CPUset upon the completion of OS booting based on the CPU pool information response, and reporting the completion of IRQ clearance (IRQ moving module 820);

a module for moving the system tasks and OS background processes to Non-RT CPUset upon the completion of OS booting based on the CPU pool information response, and reporting the completion of system tasks clearance (system tasks moving module 830);

a module for clearing the known indeterminism sources upon the completion of OS booting based on the CPU pool information response, and reporting the completion of indeterminism sources clearance (clearing module 840).

Alternatively, the said apparatus comprises:
a module for re-arranging IRQs based on the CPUset updating command;
a module for re-arranging system tasks based on the CPUset updating command; and
a module for re-arranging indeterminism source based on the CPUset updating command.

Alternatively, the said apparatus comprises:
a module for instantiating the VNF based on the VNF instantiation request.

Figure 9:
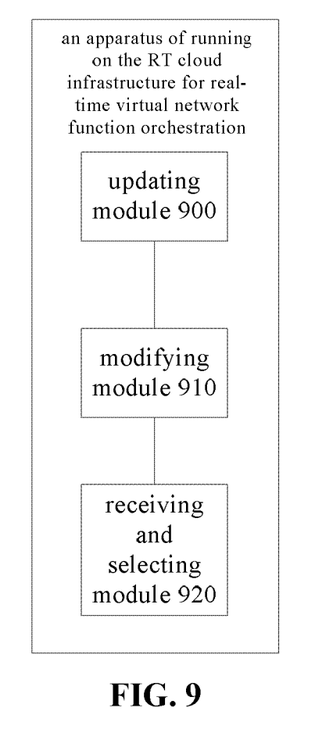
FIG. 9 is a block diagram illustrating an apparatus of the present invention of running on the RT cloud infrastructure for real-time virtual network function orchestration.

FIG. 9 illustrates an embodiment of an apparatus of running on the RT cloud infrastructure for real-time virtual network function orchestration, including the following modules:

a module for updating CPU pool based on the CPU and NUMA information, and synchronizing the CPU pool information (updating module 900);
a module for modifying CPUset and sending CPU update command (modifying module 910);
a module for receiving RT VNF deployment request and selecting the target compute node and target CPU (receiving and selecting module 920).

Alternatively, the said apparatus comprises:
a module for sending CPU pool information response based on the CPU pool information request.

Alternatively, the said apparatus comprises:
a module for sending CPU updating command.

Alternatively, the said apparatus comprises:
a module for sending VNF instantiation request.

The specific implementation functions of each module contained in the above-mentioned apparatus of running on the compute node for real-time virtual network function orchestration and apparatus of running on the RT cloud infrastructure for real-time virtual network function orchestration have been described in the previous method embodiment and are not repeated here.

Note that in the embodiment of this invention, each module is divided according to function of logic, but is not limited to the above, as long as can realize the corresponding function; In addition, the specific name of each functional module is only for the purpose of making it easy to distinguish, and it is not used to limit the arrange of protection of this invention.

Note that the invention is not limited to the embodiments described hereinabove, but extends to all the embodiments that are in accordance with its idea. The alternatives or options described in this part stem directly from the description of the preceding technological steps. They are valid for the illustrative applications such as micro-batteries but can be transposed to other microelectronic components. Unless mentioned otherwise, the steps that describe the examples presented in each part are based on the same principles mentioned beforehand.

The invention claimed is:

1. A method for real-time virtual network function orchestration, comprising:
    updating and reporting central processing unit (CPU) core real-time (RT) performance based on virtual network function (VNF) RT performance;
    sending (CPU) and non-uniform memory access (NUMA) information upon completion of operating system (OS) booting;
    moving interrupt requests (IRQs) from RT CPUset to Non-RT CPUset upon the completion of OS booting based on a CPU pool information response, and reporting the completion of IRQ clearance, wherein the RT CPUset identifies IRQs to be processed as a RT process and the Non-RT CPUset identifies IRQs that are to be processed as a Non-RT process;
    moving system tasks and OS background processes to the Non-RT CPUset upon the completion of OS booting based on the CPU pool information response, and reporting the completion of system tasks clearance;

clearing known indeterminism sources including one or more IRQs or timers upon the completion of OS booting based on the CPU pool information response, and reporting the completion of indeterminism sources clearance; and in response to a request for VNF deployment, and following the IRQ clearance, the system tasks clearance, and the indeterminism sources clearance, instantiating the VNF.

2. The method of claim 1, wherein the said method further comprises: re-arranging IRQs, system tasks and indeterminism source based on a CPUset updating command.

3. The method of claim 1, wherein the said method further comprises: instantiating a VNF based on a VNF instantiation request.

4. An apparatus for running on a compute node for real-time virtual network function orchestration, the apparatus comprising: one or more processors; and storage for storing one or more computer programs, wherein when the one or more computer programs are executed by the one or more processors, the one or more processors implement:

updating and reporting central processing unit (CPU) core real-time (RT) performance based on virtual network function (VNF) RT performance;

sending CPU and non-uniform memory access (NUMA) information upon the completion of operating system (OS) booting;

moving interrupt requests (IRQs) from RT CPUset to Non-RT CPUset upon the completion of OS booting based on a CPU pool information response, and reporting the completion of IRQ clearance, wherein the RT CPUset identifies IRQs to be processed as a RT process and the Non-RT CPUset identifies IRQs to be processed as a Non-RT process;

moving system tasks and OS background processes to the Non-RT CPUset upon the completion of OS booting based on the CPU pool information response, and reporting the completion of system tasks clearance;

clearing known indeterminism sources including one or more IRQs or timers upon the completion of OS booting based on the CPU pool information response, and reporting the completion of indeterminism sources clearance; and in response to a request for VNF deployment, and following the IRQ clearance, the system tasks clearance, and the indeterminism sources clearance, instantiating the VNF.

5. The apparatus of claim 4, wherein when the one or more computer programs are executed by the one or more processors, the one or more processors implement:

re-arranging IRQs based on a CPUset updating command;

re-arranging system tasks based on the CPUset updating command; and re-arranging an indeterminism source based on the CPUset updating command.

6. The apparatus of claim 4, wherein when the one or more computer programs are executed by the one or more processors, the one or more processors implement: instantiating a VNF based on a VNF instantiation request.

7. A non-transitory computer readable storage medium, storing computer code, wherein an apparatus is caused, upon execution of the computer code, to:

update and report central processing unit (CPU) core real-time (RT) performance based on virtual network function (VNF) RT performance;

send CPU and non-uniform memory access (NUMA) information upon completion of operating system (OS) booting;

move interrupt requests (IRQs) from RT CPUset to Non-RT CPUset upon the completion of OS booting based on a CPU pool information response, and report the completion of IRQ clearance, wherein the RT CPUset identifies IRQs to be processed as a RT process and the Non-RT CPUset identities IRQs to be processed as a Non-RT process;

move system tasks and OS background processes to the Non-RT CPUset upon the completion of OS booting based on the CPU pool information response, and report the completion of system tasks clearance;

clear known indeterminism sources including one or more IRQs or timers upon the completion of OS booting based on the CPU pool information response, and report the completion of indeterminism sources clearance; and in response to a request for VNF deployment, and following the IRQ clearance, the system tasks clearance, and the indeterminism sources clearance, instantiate the VNF.

* * * * *

UNITED STATES PATENT AND TRADEMARK OFFICE
CERTIFICATE OF CORRECTION

PATENT NO. : 11,625,258 B2
APPLICATION NO. : 16/760117
DATED : April 11, 2023
INVENTOR(S) : Cheng Wang Page 1 of 1

It is certified that error appears in the above-identified patent and that said Letters Patent is hereby corrected as shown below:

In the Claims

In Column 16, Line 30, Claim 7, delete "identities" and insert -- identifies --, therefor.

Signed and Sealed this
Twenty-fifth Day of July, 2023

Katherine Kelly Vidal
*Director of the United States Patent and Trademark Office*